Aug. 18, 1936.    G. JOHNSON    2,051,715
SLIDE FASTENER SOCKET
Filed June 22, 1934
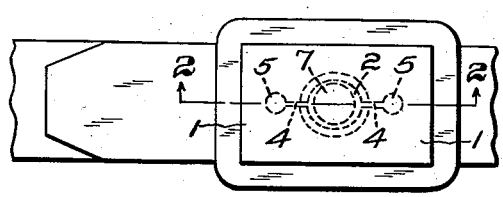
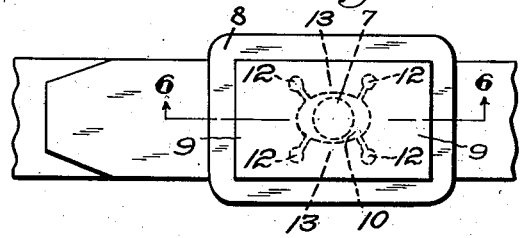
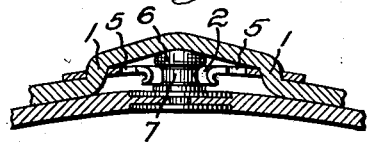
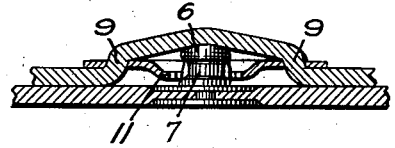
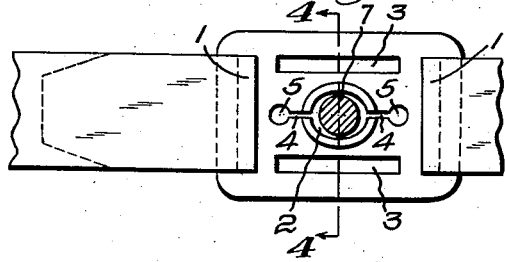
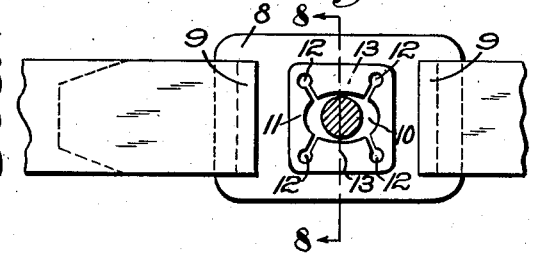
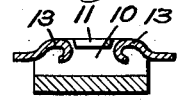
Inventor:
Gustav Johnson,
by Walter S. Jones
Atty Patented Aug. 18, 1936

2,051,715

UNITED STATES PATENT OFFICE 2,051,715

SLIDE FASTENER SOCKET

Gustav Johnson, West Roxbury, Mass., assignor to United-Carr Fastener Corporation, Cambridge, Mass., a corporation of Massachusetts Application June 22, 1934, Serial No. 731,930

3 Claims. (Cl. 24—77)

My invention aims to provide improvements in slide fastener socket members for attachment to straps and the like.

In the drawing, which illustrates preferred embodiments of my invention:—

Figure 1 is a top plan view of a fastener assembly including one form of my improved socket;

Fig. 2 is a section taken on the line 2—2 of Fig. 1, showing the socket engaged with a stud;

Fig. 3 is a bottom plan view of the fastener assembly shown in Fig. 1;

Fig. 4 is a section taken on the line 4—4 of Fig. 3;

Fig. 5 is a top plan view of another form of my improved socket assembled with a strap;

Fig. 6 is a cross-section taken on the line 6—6 of Fig. 5;

Fig. 7 is a bottom plan view of the socket and strap shown in Fig. 5; and

Fig. 8 is a section taken on the line 8—8 of Fig. 7.

Both the forms of my improved socket illustrated by the drawing show a simple, inexpensive, one-piece fastener socket of the slide fastener type, each having the advantage of a positive lateral locking means.

The embodiment of my invention as illustrated in Figs. 1 to 4 inclusive is formed from a single piece of sheet metal to provide a relatively thin plate having a pair of rectangular strap-receiving slots 1—1 (Figs. 2 and 3) transversely disposed thereof and located at opposite ends. These slots enable the socket to be adjustably attached to the carrying strap with which it is intended to be used. Between the slots 1—1 is located a stud-engaging means in which is formed a stud-receiving aperture of special shape 2. The specific socket shown is for use with a rigid stud as shown in Fig. 2. Hence the stud-receiving aperture must be allowed to expand and contract. Between the stud-receiving aperture 2 and each of the sides of the socket I have provided slots 3—3 substantially parallel to the sides. Also I have provided slits 4—4 extending from the aperture 2 outwardly toward each strap-receiving slot 1—1 and parallel to the above-mentioned other slots 3—3. Thus the central portion of the socket is transformed into a cross-bar member of two sections. The slits 4—4, with their terminal enlargements 5—5 (Fig. 3) cooperate with the slots 3—3 to make the aperture 2 yieldable and allow it to expand and contract laterally when a stud is forced through the aperture.

In Figs. 2 and 4 the stud-receiving aperture is shown as having a collar rolled up and so formed as to facilitate entrance of the stud into the aperture and also to provide a smooth bearing surface to keep the stud in proper position relative to the socket.

The aperture 2 is designed so that its extremities are of less width than its median opening (Figs. 1 and 3). When the socket is in use and engaged with a cooperating stud, and a tension is put on the strap on either side of the socket, the constricted neck 7 of the stud (Fig. 2) will be forced into one of the narrow ends of the aperture and held there by the relatively large size of the head 6 and the relative rigidity of the socket at that point. When the socket and stud are in the above-mentioned relation they are locked against separation by any other means than relieving the tension upon the strap. An ordinary snap fastener socket is so designed as to be readily disengaged from its cooperating stud at any time, whether or not there is a tension on the strap. Also the usual form of keyhole socket will dislodge itself if tension upon the strap is relaxed. My improved socket cannot be disengaged when there is tension on the strap, nor will it disengage itself when the tension is relaxed. This feature is very useful where the socket is used on a strap extending from one side of a shoe across the instep and snapped tightly down on the other side of the shoe.

In the form of my improved fastener socket as shown in Figs. 5 to 8 inclusive, I have provided a plate 8. This plate 8 is provided with transversely disposed strap-receiving slots 9—9 at opposite ends and is further provided with an oval stud-receiving aperture 10 in a centrally located rectangular depressed portion 11.

In the plate 8, I have provided a plurality of radial slits 12 extending outwardly from the stud-receiving aperture 10 and terminating in enlargements. These slits are for the purpose of rendering the material at the edges of the aperture 10 yieldable, so that the aperture may be enlarged when a stud is forced into it and contract again upon the constricted neck of the stud (Fig. 6). The slits 12 (Fig. 7) divide the depressed portion 11 of the plate 8 into four leaves (Fig. 7), each of which is similar in shape and size to the one directly opposite. It will be seen that one pair of leaves (13—13) is wider than the other. It is upon these wide leaves that the collar is formed as shown in Fig. 8. This collar provides the same type of smooth bearing surface as described above in connection with the first mentioned form of my improved socket.

Since the socket is to be used with a rigid stud (Fig. 6), it is necessary to provide these opposite leaves (13—13) with a spring action. I have accomplished this by the combination of the curve made by the depressed portion 11 and the raised collar (Fig. 8).

While I have illustrated and described preferred embodiments of my invention, I do not wish to be limited thereto because the scope of my invention is best defined by the following claims.

I claim:—

1. A slide fastener socket comprising a single plate having strap-receiving slots transversely disposed thereof and located at opposite ends, said socket having a stud-receiving aperture located between the slots and elongated in the direction of each of the slots, laterally yieldable stud-engaging means made yieldable by radial slits extending outwardly from the aperture at equal angles to the longitudinal axis of the socket, said slits dividing said stud-engaging means into pairs of oppositely disposed leaves, the leaves of only one of said pairs having a collar portion at the edges adjacent to said aperture to facilitate engagement of a stud with said stud-engaging means, and said plate having a depression located between the strap-receiving slots for the purpose of rendering the portions of the plate between the said radial slits more yieldable and to impart a spring action to said sections.

2. A slide fastener socket comprising a single plate having strap-receiving slots transversely disposed thereof and located at opposite ends, said socket having a stud-receiving aperture located between the strap-receiving slots and elongated in the direction of at least one of said slots, laterally yieldable stud-engaging means adjacent said aperture made yieldable by radial slits extending from the aperture towards each extremity of each of the strap-receiving slots, said slits dividing said stud-engaging means into a plurality of pairs of leaves, the leaves of one of said pairs being wider than the leaves of said other pairs and said wide leaves having the free edges adjacent said aperture so bent as to provide a spring-gripping action upon the cooperating stud.

3. A slide fastener socket comprising a single plate having strap-receiving slots transversely disposed at opposite ends thereof, said socket having a stud-receiving aperture located between the slots and elongated in the direction of at least one of said slots, said plate being divided by slits extending outwardly from the aperture to form laterally yieldable stud-engaging means adjacent to said aperture, said stud-engaging means comprising two pairs of leaves, the leaves of one of said pairs being located opposite to each other and having their free edges adjacent to the longitudinal edge of said aperture, each of the leaves of said last-mentioned pair being wider than the leaves of said other pair and having a collar bent from the free edge thereof to facilitate engagement of a stud with said socket.

GUSTAV JOHNSON.